United States Patent [19]

Kim

[11] Patent Number: 5,191,434

[45] Date of Patent: Mar. 2, 1993

[54] SYNCHRONIZING SIGNAL RESTORATION CIRCUIT

[75] Inventor: Yong-je Kim, Kyunggi-do, Rep. of Korea

[73] Assignee: Samsung Electronics Co., Ltd., Suwon, Rep. of Korea

[21] Appl. No.: 737,728

[22] Filed: Jul. 30, 1991

[30] Foreign Application Priority Data

Oct. 31, 1990 [KR] Rep. of Korea .................. 90-175885
Jul. 20, 1991 [KR] Rep. of Korea .................. 91-12439

[51] Int. Cl.$^5$ ............................................. H04N 5/76
[52] U.S. Cl. ..................................... 358/335; 358/320; 358/337; 358/319; 358/148
[58] Field of Search ............... 358/319, 320, 335, 337, 358/148, 150, 153, 154; 360/37.1, 36.1; 380/5

[56] References Cited

U.S. PATENT DOCUMENTS

| | | | |
|---|---|---|---|
| 3,005,869 | 10/1961 | Dolsy ............................ | 358/148 |
| 4,792,853 | 12/1988 | Yamazishi et al. ............ | 358/153 |
| 4,933,774 | 6/1990 | Ishimaru ....................... | 358/335 |
| 5,057,928 | 10/1991 | Nagashima .................... | 338/236 |

Primary Examiner—Tommy P. Chin
Assistant Examiner—Robert Chevalier
Attorney, Agent, or Firm—Robert E. Bushnell

[57] ABSTRACT

In a video recording/reproducing apparatus, scattered synchronizing signals included in video signals are restored by a synchronizing signal restoration circuit. The circuit includes an input terminal for receiving video signals, a synchronizing signal separator for separating the synchronizing signal from the video signals, a standard clock pulse generator for generating a standard clock pulse train with a period much shorter than those of the separated synchronizing signal, an even/odd field detector for detecting whether the video signal is of an even or an odd field according to the separated synchronizing signals and the standard clock pulse generator, a synchronizing pattern generator for responding to the detected results of the even/odd field detector and the standard clock pulse train to generate synchronizing patterns data conforming to the respective fields, a composite synchronizing signal generator for generating composite synchronizing signals by differently dividing the frequency of the standard clock pulse train corresponding to the value of the synchronizing pattern data, and an adder for adding the composite synchronizing signal generated by the composite synchronizing signal generated by composite synchronizing signal generator to the video signal.

5 Claims, 4 Drawing Sheets

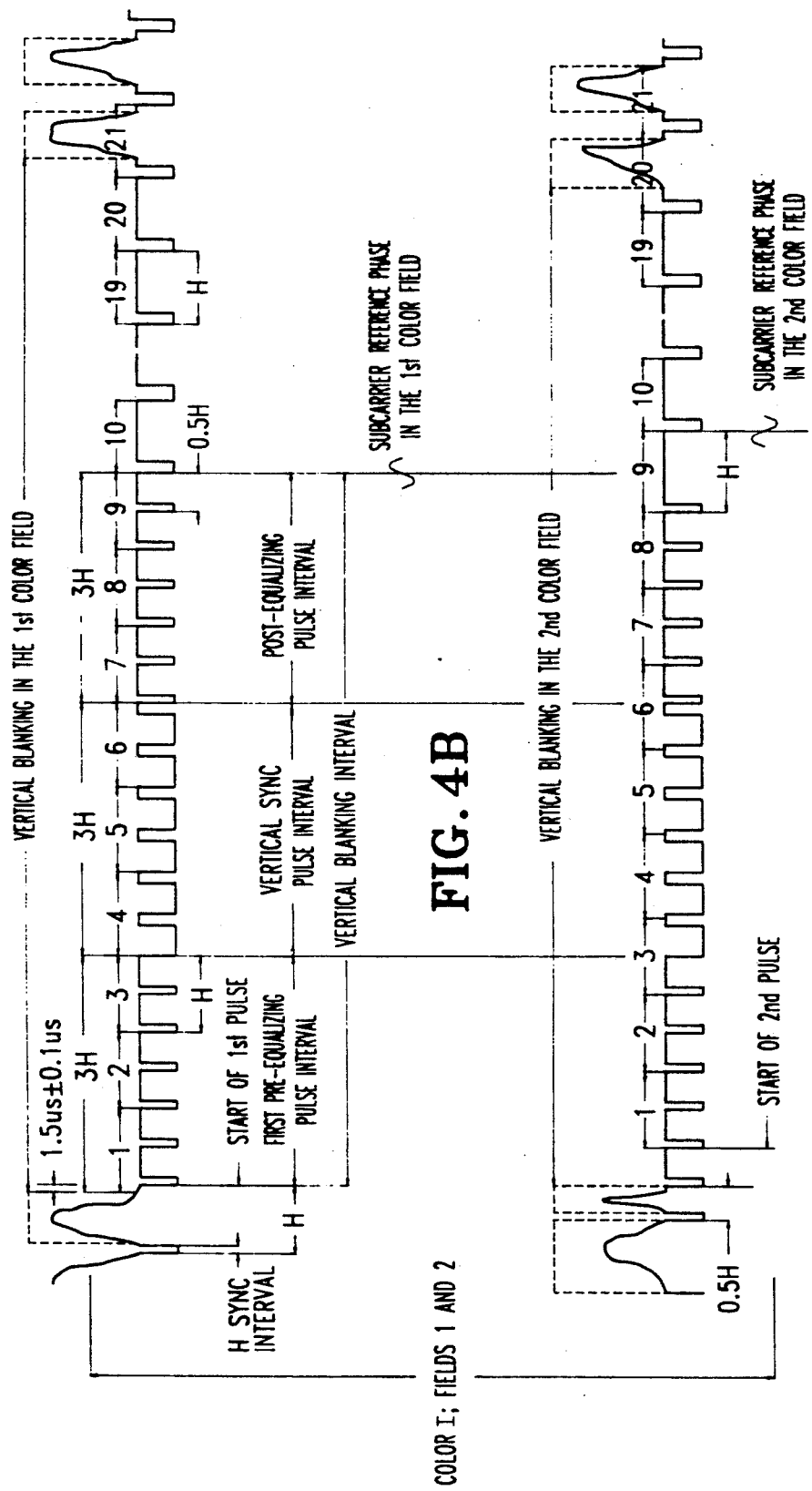

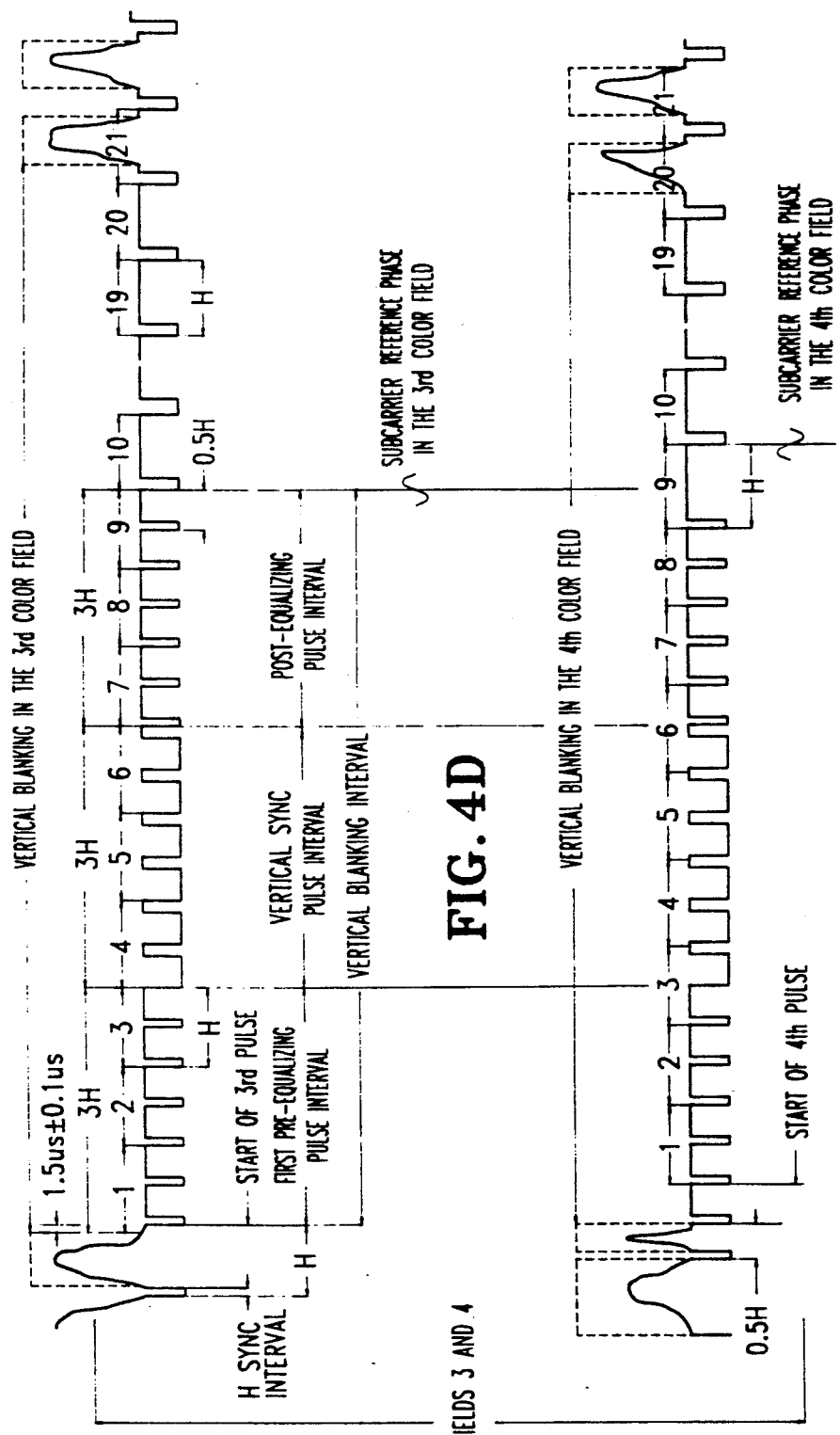

SYNCHRONIZING SIGNAL RESTORATION CIRCUIT

BACKGROUND OF THE INVENTION

This invention relates to an video recording/reproducing apparatus for recording video signals on recording media or for reproducing video signals from the recording media, and more particularly to a circuit for restoring horizontal and vertical synchronizing signals included in video signals.

Generally, in order to display video information accurately on an video display device, e.g., a cathode ray tube, a composite video signal comprises a horizontal synchronizing signal in which during a horizontal scanning period, display information is specified by an election beam from left to right and during a horizontal blanking period, the movement of the election beam is specified from right to left, a vertical synchronizing signal in which during a vertical scanning period, display information is specified by the election beam from top to bottom and during a vertical blanking period, the movement of the electron beam is specified from bottom to top, and video information arranged in the scanning period of the aforementioned horizontal and vertical synchronizing signals. The composite video signal including the above horizontal and vertical synchronizing signals and video information, are affected by noise while being transmitted through transmission media such as the air, magnetic tape cassettes, compact disk videos, and accordingly the scanning period and blanking period of the synchronizing signal are altered. As a result, the blanking period encroaches upon the video information period within the scanning period and the image displayed on the video display device oscillates from left to right or from top to bottom. Moreover, a conventional video recording/reproducing apparatus records video signals received by a built-in tuner or external video signals received from the outside on the recording media without correcting the synchronizing signals included in the video signals during recording, and outputs video signals reproduced from the recording media to a display device mounted externally without correcting the synchronizing signals included in the video signal during reproducing. Therefore, the video signal recorded or reproduced using a conventional video recording/reproducing apparatus has a scattered synchronizing signal, and thus, the picture displayed on the video display device has the problem of being severely shaken from left to right or from top to bottom.

Accordingly, it is an object of this invention to provide a synchronizing signal restoration circuit for correcting the synchronizing periods of synchronizing signals included in video signals to prevent the shaking of the video displayed on a video display device in a video recording/reproducing apparatus.

To accomplish the above object, there is provided a synchronizing signal restoration circuit for restoring scattered synchronizing signals included in video signals adapted to a video recording/reproducing apparatus, and includes:

an input terminal for receiving video signals to be reproduced or recorded;

a synchronizing signal separator for separating synchronizing signals from video signals supplied through the input terminal;

a standard clock pulse generator for generating a standard clock pulse train having a period of time much shorter than that of the separated synchronizing signal;

an even/odd field detector for receiving the separated synchronizing signals and the standard clock pulse train and detecting whether the video signal input to the input terminal is of an even or an odd field;

a synchronizing pattern generator for responding to the detected results of the even/odd field detector to generate recognizing pattern data corresponding to the respective fields using the standard clock pulse train;

a composite synchronizing signal generator for generating composite synchronizing signals by differently dividing the frequency of the standard clock pulse train according to the value of the synchronizing pattern data; and an adder for adding the composite synchronizing signal generated in the composite synchronizing signal generator to the video signal input to the input terminal.

DESCRIPTION OF THE DRAWING

The above features and objects of this invention will be described in detail in reference to the accompanying drawings.

FIG. 4 included FIG. (4A) to FIG. (6D) is waveform graphs representing the outputs of respective parts of the composite synchronizing signal generator of FIG. 3.

FIG. 6 is waveform graphs representing exemplary inputs and outputs of respective components of the synchronizing signal restoration circuit of FIGS. 1-3.

DETAILED DESCRIPTION OF THE DRAWINGS

Figure 1:
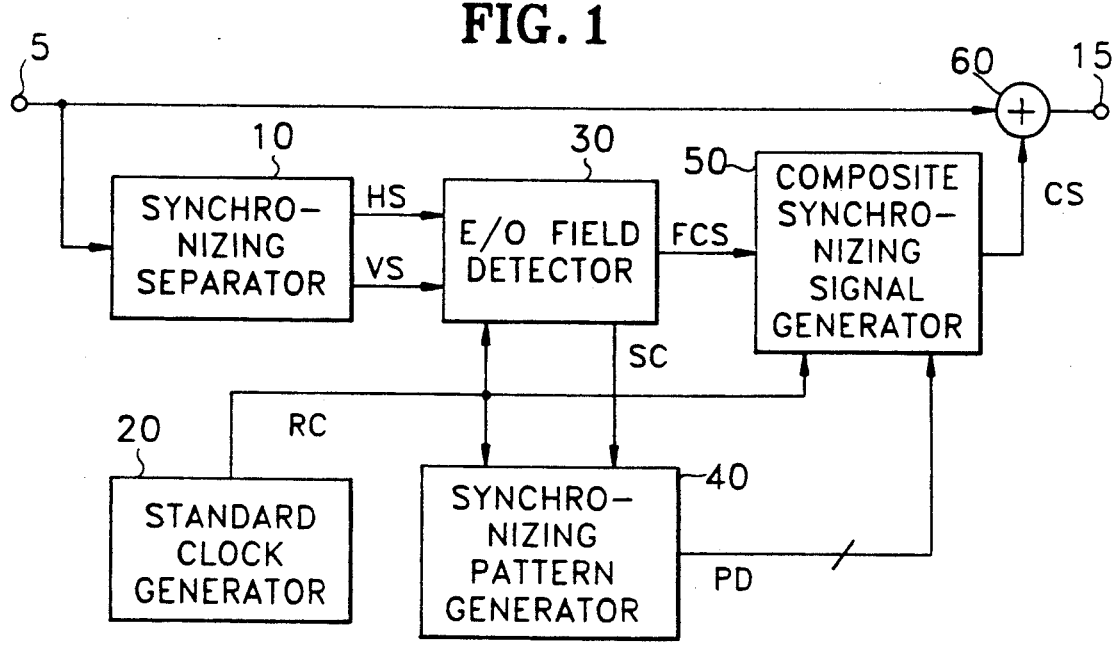
FIG. 1 is a block diagram of a synchronizing signal restoration circuit according to this invention.

FIG. 1 is a block diagram of a synchronizing signal restoration circuit according to this invention. In FIG. 1, input terminal 5 is connected to a specified composite video signal supply source (not shown in the figure). Input terminal 5 is also connected to the first input terminal of adder 60 and the input terminal of the synchronizing separator 10. The first and second output terminals of the synchronizing separator 10 are connected to the fast and second input terminals of the even/odd (hereinafter referred to as E/O) field detector 30. The output terminal of the standard clock generator 20 is connected to the third input terminal of the E/O field detector 30, the first input terminal of the synchronizing pattern generator 40 and the first input terminal of the composite synchronizing signal generator 50. The fast output terminal of the E/O field detector 30 is connected to the second input terminal of the composite synchronizing signal generator 50, and the second output terminal of the E/O field detector 30 is connected to the second input terminal of the synchronizing pattern generator 40. The output terminal of the synchronizing pattern generator 40 is connected to the third input terminal of the composite synchronizing signal generator 50. The output terminal of the composite synchronizing signal generator 50 is connected to the second input terminal of the adder 60. The output terminal of the adder 60 is connected to the output terminal 15.

In the operation of the circuit, the synchronizing separator 10 separates horizontal synchronizing signals HS and vertical synchronizing signals VS from composite video signals and supplies the same to the E/O field detector 30.

The standard clock generator 20 generates a standard clock pulse train having a frequency generated in a crystal oscillator, e.g., 10 MHz, which is much higher than that of the horizontal synchronizing signal HS. The frequency of the standard clock pulse train may be, for example, 320 or 640 times the frequency of the horizontal synchronizing signal, i.e., 320 fH or 640 fH, where fH denotes the frequency of the horizontal synchronizing signal.

The E/O field detector 30 counts up the scanning period of the horizontal synchronizing signal HS one by one according to the standard clock pulse train, and detects whether the counted value on the starting edge of the vertical synchronizing pulse of the vertical synchronizing signal is greater than the value corresponding to a half-period of the horizontal synchronizing signal. From the result of the detection, if the counted value is greater than the half-period value of the horizontal synchronizing signal, a high or low logic state E/O field detector signal FCS is generated to represent an even field video signal for the composite video signal received at input terminal 5, and conversely, if the counted value is less than the half-period value of the horizontal synchronizing signal, a low or high logic state E/O field detector signal FCS is generated to represent an odd field video signal for the composite video signal received at input terminal 5. Also, the E/O field detector 30 generates a field start detection signal SC having a very narrow pulse width on the starting edge of a vertical synchronizing pulse of a vertical synchronizing signal. The E/O field detector signal FCS is applied to the second input terminal of the composite synchronizing signal generator 50, and the field start detection signal SC is applied to the second input terminal of the synchronizing pattern generator 40.

The synchronizing pattern generator 40, after being initialized by the field start detection signal SC, generates a synchronizing pattern data having predetermined bits which increases by one for every standard period of the horizontal synchronizing signal. The synchronizing pattern data takes a value of "1" near the starting edge of the vertical synchronizing pulse of the vertical synchronizing signal separated in the synchronizing signal separator 10 if the composite video signal received at the input terminal 5 is an odd field video signal. On the other hand, if the composite video signal received at the input terminal 5 is an even field video signal, the synchronizing pattern data takes a value of "1" at approximately a half-period of the horizontal synchronizing signal away from the starting edge of the vertical synchronizing pulse of the vertical synchronizing signal separated at the synchronizing signal separator 10.

The composite synchronizing signal generator 50 so selects a synchronizing signal generating mode for an odd or even field according to the logic state of the E/O field detector signal FCS, and in the selected mode, generates different composite synchronizing signals CS for each field by sequentially constructing synchronizing waveforms corresponding to the logic value of the synchronizing pattern data according to the standard clock pulse train.

The adder 60 adds the composite video signal to the composite synchronizing signal CS and transmits the result through the output terminal 15. The composite video signal on the output terminal 15 is adjusted so that the ratio of the scanning period and the blanking period of the synchronizing signals exactly coincides with the standard ratio by the composite synchronizing signal generated from the composite synchronizing signal generator 50.

Figure 2:
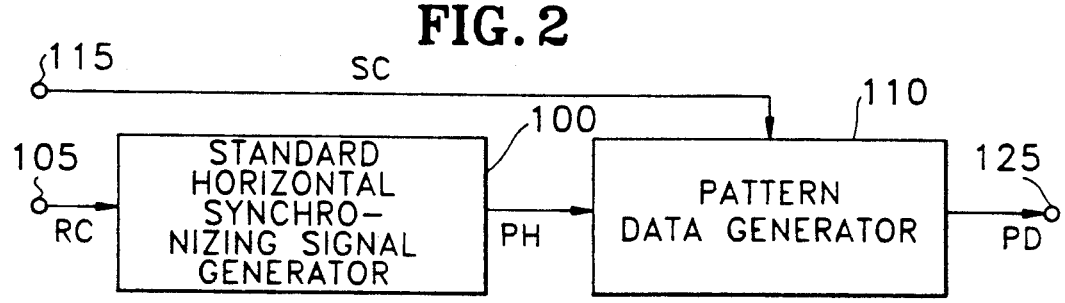
FIG. 2 is a block diagram of a synchronizing pattern generator which is a part of the synchronizing signal restoration circuit of FIG. 1.
Figure 3:
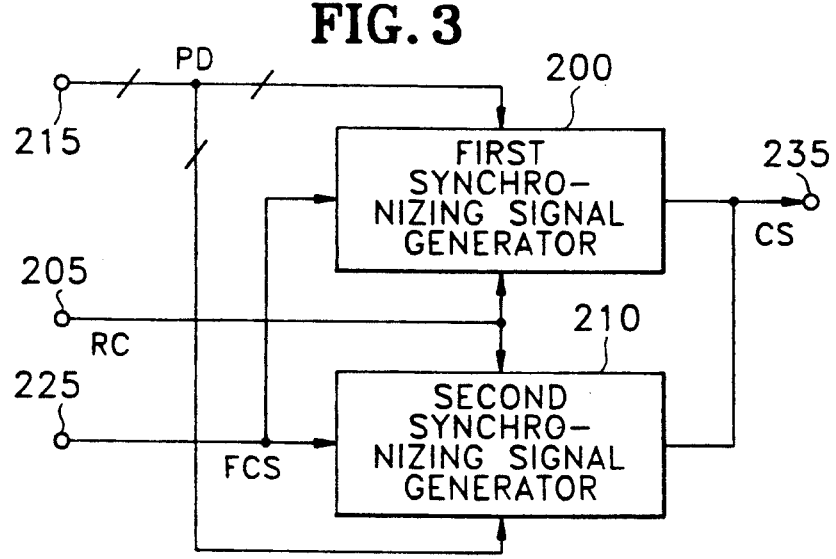
FIG. 3 is a block diagram of a composite synchronizing signal generator which is a part of the synchronizing signal restoration circuit of FIG. 1.

The synchronizing signal restoration circuit is further explained in accordance with the components of FIGS. 1–3 and the waveforms of FIG. 6.

E/O field detector 30 receives vertical and horizontal synchronizing signals VS and HS, such as the waveforms shown in FIGS. 6A and 6B, from synchronizing separator 10. E/O field detector 30 also receives standard clock pulse train RC from standard clock generator 20 to generate an internal reference clock IRC such as the waveform shown in FIG. 6C.

Here, E/O field detector 30 detects the falling edge of the horizontal synchronizing signal HS to produce a high internal reference clock during one-half of the horizontal synchronizing signal interval and a low internal reference clock during the other half of the horizontal synchronizing signal interval. Accordingly, if the falling edge of vertical synchronizing signal VS occurs while the internal reference clock is "high", E/O field detector 30 determines that the current field is an "odd" field. Conversely, if the internal reference clock is "low" at the falling edge of vertical synchronizing signal VS, the E/O field detector determines that the current field is an "even" field. In other words, E/O field detector 30 generates an E/O field detector signal FCS, as shown in FIG. 6D, to represent an odd or even field signal for the currently input composite video signal.

Meanwhile, E/O field detector 30 generates a field start detection signal SC as shown in FIGS. 6E and 6H based on the internal E/O field information. Accordingly, synchronizing pattern generator 40 receives field start detection signal SC according to FIG. 6E or 6H, and generates synchronizing pattern data PD shown in FIGS. 6G and 6I, respectively, based on the standard horizontal synchronizing signal PH which is internally produced according to the received standard clock pulse train RC as shown in FIG. 2.

Composite synchronizing signal generator 50 receives E/O field detector signal FCS and synchronizing pattern data PD and generates composite synchronizing signal CS based on standard clock pulse train RC, as shown in FIG. 1. This composite synchronizing signal CS is output from first or second synchronizing signal generator 200 or 210, depending on the odd or even field of the composite video signal.

FIG. 2 is a detailed block diagram of the synchronizing pattern generator 40 shown in FIG. 1. In FIG. 2, input terminal 115 is connected to the second output terminal of the E/O field detector 30 shown in FIG. 1. Input terminal 105 is connected to the output terminal of the standard clock generator 20 shown in FIG. 1. Input terminal 105 is connected to the input terminal of the standard horizontal synchronizing signal generator 100. The output terminal of the standard horizontal synchronizing signal generator 100 is connected to the first input terminal of the pattern data generator 110. The second input terminal of the pattern data generator 110 is connected to input terminal 115, and the output terminal of the pattern data generator 110 is connected to output terminal 125. Also, output terminal 125 is connected to the third input terminal 125 of the composite synchronizing signal generator 50 shown in FIG. 1.

In the operation of the circuit of FIG. 2, the standard horizontal synchronizing signal generator 100 divides the frequency of the standard clock pulse train RC, and generates a standard horizontal synchronizing signal PH with a period (approximately 63.5 μs) of a standardized horizontal synchronizing signal.

The pattern data generator 110, after being initialized by the field start detection signal SC, generates pattern data which increases by one for every period of the standard horizontal synchronizing signal according to the standard horizontal synchronizing signal.

FIG. 3 is a detailed block diagram of the composite synchronizing signal generator 50 shown is FIG. 1. In FIG. 3, input terminal 205 is connected to the output terminal of the standard clock generator 20 shown in FIG. 1 and also to the respective first input terminals of the fast and second synchronizing signal generators 200 and 210. Input terminal 215 is connected to the output terminal of the synchronizing pattern generator 40 shown in FIG. 1 (in more detail, the output terminal of the pattern data generator 110 shown in FIG. 2). Input terminal 215 is also connected to the respective second input terminals of the first and second synchronizing signal generators 200 and 210. Input terminal 225 is connected to the first output terminal of the E/O field detector 30 shown in FIG. 1 and also to the respective third input terminals of the first and second synchronizing signal generators 200 and 210. The output terminals of the first and second synchronizing signal generators 200 and 210 are connected to the output terminal 235.

In the operation of the circuit of FIG. 3, the first synchronizing signal generator 200 operates when the E/O field detector signal FCS has a logic state representing an odd field, and in operation, generates a composite synchronizing signal suited to an odd field by differently dividing the frequency of the standard clock pulse train RC according to the logic value of the pattern data PD.

The second synchronizing signal generator 210 operates when the E/O field detector signal FCS has a predetermined logic state representing an even field, and in operation, generates a composite synchronizing signal suited to an even field by differently dividing the frequency of the standard clock pulse train RC according to the logic value of the pattern data PD.

FIGS. 4A to 4D are waveform graphs for the outputs of the adder 60 shown in FIG. 1, wherein the composite synchronizing signal generated from the first and second synchronizing signal generators 200 and 210 shown in FIG. 3 is included in the composite video signal.

FIG. 4A and FIG. 4C are waveform graphs for the outputs of the adder 60 in which the composite synchronizing signal generated from the first synchronizing signal generator 200 is folded in the composite video signal, and FIG. 4B and FIG. 4D are waveform graphs for the outputs of the adder 60 in which the composite synchronizing signal generated from the second synchronizing signal generator 210 is folded in the composite video signal.

Figure 5:
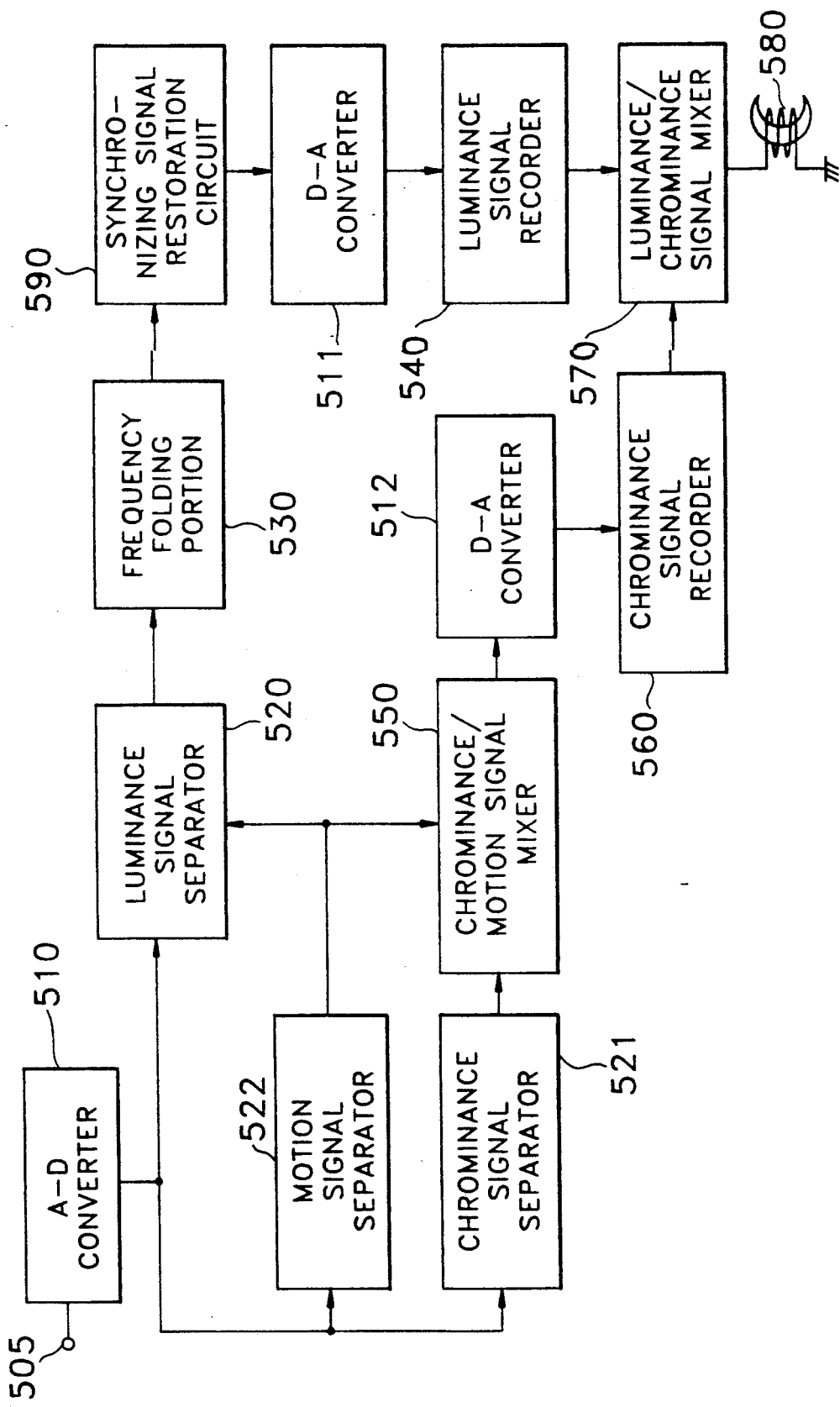
FIG. 5 is a block diagram of a video recording/reproducing apparatus to which the synchronizing signal restoration circuit of this invention is applied.

FIG. 5 is a block diagram of a video recording system to which the circuit of this invention is adapted, and in FIG. 5, the synchronizing signal restoration circuit 590 according to this invention is inserted between the D-A converter 511 and the frequency folding portion 530.

That is, a good example of the video recording system to which the circuit of the present invention is adapted is shown in FIG. 5. In FIG. 5, the synchronizing signal restoration circuit 590 according to this invention is inserted between the frequency folding portion 530 and D-A converter 511. The synchronizing signal restoration circuit 590 can also be installed between the D-A converter 511 and the luminance signal recorder 540. However, the operation of the synchronizing signal restoration circuit 590 is described below with reference to FIG. 5 as a preferred embodiment of the present invention.

Referring to FIG. 5, A-D converter 510 samples composite video signals according to a sampling clock of approximate 10 MHz, and generates a digital composite video signal by coding the sampled signal. The motion signal separator 522 separates the motion signal representing the amount of motion of the pixel on the screen from the digital composite video signal.

The luminance signal separator 520 separates luminance signals derived spatially and luminance signals derived temporally from the digital composite video signal, and generates a luminance signal by suitably combining the two luminance signals according to the value of the motional signal.

The chrominance signal separator 521 separates the chrominance signal from the digital composite video signal.

The frequency folding portion 530 attenuates high frequency components(luminance signals having frequencies higher than 2.5 MHz) of the luminance signal, folds the same in the low-frequency luminance signal by sub-Nyquist sampling, and generates a folded luminance signal by low-pass filtering the superposed luminance signal so as to have a high frequency cut-off characteristic of 2.5 MHz.

The synchronizing signal restoration circuit 590 restores in digital forms the scattered synchronizing signals among the folded luminance signal supplied from the frequency folding portion 530 according to the operation described in FIG. 1 through FIG. 3.

The D-A converter 511 converts the folded luminance signals and the synchronizing signals in digital form received from the synchronizing signal restoration circuit 590 into analog forms.

The luminance signal recorder 540 frequency-modulates the folded luminance signals and the synchronizing signals supplied from the D-A converter 511 so as to be recorded on recording media.

The chrominance/motion signal mixer 550 mixes the chrominance signal and the motion signal and supplies the result to the D-A converter 512. The D-A converter 512 converts the chrominance signal mixed with the motion signal in a digital form which is the output of the chrominance/motion signal mixer 550 into an analog form.

The chrominance signal recorder 560 modulates the amplitude of the chrominance signal mixed with the motion signal received from the D-A converter 512 by a carrier wave of about 629 KHz.

The chrominance/luminance signal mixer 570 mixes the frequency-modulated luminance signal and the amplitude-modulated chrominance signal and provides the result to the magnetic recording head 580. The magnetic recording head 580 records the output of the chrominance/luminance signal mixer 570 on a magnetic tape.

As described above, the circuit of this invention has the advantages in that it can transmit accurate synchronizing signals and restore synchronizing signals included in composite video signals scattered during transmission in reproducing by deliberately generating horizontal and vertical synchronizing signals of standard period and form and inserting them into composite video signals, and can prevent oscillation of the image by restoring the synchronizing signals.

What is claimed is:

1. A synchronizing signal restoration circuit, in a video recording/reproducing apparatus for recording and/or reproducing video signals on or from recording media, comprising:
    an input terminal for receiving video signals to be reproduced or recorded;
    a synchronizing signal separator for separating the synchronizing signals from the video signals supplied through said input terminal;
    a standard clock pulse generator for generating a standard clock pulse train with a period much shorter than those of said separated synchronizing signals;
    an even/odd field detector for detecting whether said video signal input to the input terminal is of an even or an odd field based on said separated synchronizing signals and said standard clock pulse train;
    a synchronizing pattern generator for responding to the detected results of said even/odd field detector to generate synchronizing patterned data corresponding to the respective fields using said standard clock pulse train;
    a composite synchronizing signal generator for generating composite synchronizing signals by dividing a frequency of said standard clock pulse train according to a frequency division ratio corresponding to a value of said synchronizing pattern data; and
    an adder for adding the composite synchronizing signal generated in said composite synchronizing signal generator to the video signal of the input terminal,
    whereby scattered synchronizing signals included in video signals are restored.

2. A synchronizing signal restoration circuit as claimed in claim 1, wherein said synchronizing pattern generator comprises:
    a standard synchronizing signal generator for generating standard horizontal synchronizing signals by dividing the frequency of said standard clock pulse train by a specific frequency division ratio; and
    a pattern data generator for generating pattern data which increases by one according to said standard horizontal synchronizing signal starting from different initial values for each field according to the detection results of said even/odd field detector.

3. A synchronizing signal restoration circuit in a video recording/reproducing apparatus for recording and/or reproducing video signals on or from recording media, comprising:
    an input terminal for receiving video signals to be reproduced or recorded;
    a synchronizing signal separator for separating the synchronizing signals from the video signal received from said input terminal;
    a standard clock generator for generating a standard clock pulse train with a period much shorter than those of said separated synchronizing signals;
    an even/odd field detector for determining whether said video signal supplied to the input terminal is of an even or an odd field based on said separated synchronizing signals and said standard clock pulse train, and generating even/odd field detector signals of different logic states according to the determined result, and generating a field start detection signal in pulse form by detecting a starting point of the field;
    a synchronizing pattern generator for generating standard synchronizing pattern data which is initiated by said field start detection signal and then takes different values for every standard period according to said standard clock pulse train;
    a composite synchronizing signal generator for setting a field mode according to the logic level of said even/odd field detector signal, and a frequency division ratio corresponding to the value of said synchronizing pattern data for each mode, and generating a composite synchronizing signal by dividing a frequency of said standard clock pulse train according to the frequency division ratio; and
    an adder for adding the composite synchronizing signal generated by said composite synchronizing signal generated by said composite synchronizing signal generator to the video signal input to said input terminal.

4. A synchronizing signal restoration circuit as claimed in claim 3, wherein said composite synchronizing signal generator comprises two synchronizing signal generators operating in a mutual compensational manner according to the logic state of said even/odd field detector signal, and in operation, generating composite synchronizing signals by dividing the frequency of said standard clock pulse train by the frequency division ratio according to the value of said synchronizing pattern data.

5. A synchronizing signal restoration circuit as claimed in claim 3, wherein said separated synchronizing signal includes a horizontal synchronizing signal and a vertical synchronizing signal, and said even/odd detector is detecting:
    a falling edge of the horizontal synchronizing signal, producing a high internal reference clock during one half of a horizontal synchronizing signal interval and producing a low interval reference clock during a second half of the horizontal synchronizing signal interval; and
    a falling edge of the vertical synchronizing signal, said even/odd field detector determining the odd field when the falling edge of the vertical synchronizing signal corresponds to the high internal reference clock, and determining the even field when the falling edge of the vertical synchronizing signal corresponds to the low internal reference clock.

* * * * *

UNITED STATES PATENT AND TRADEMARK OFFICE
CERTIFICATE OF CORRECTION

PATENT NO. : 5,191,434
DATED : 2 March 1993
INVENTOR(S) : Yong-Je KIM It is certified that error appears in the above-identified patent and that said Letters Patent is hereby corrected as shown below:

On the title page, item (30):

IN THE FOREIGN APPLICATION PRIORITY DATA

Change "90-175885" to --90-17588--.

Signed and Sealed this

Fifth Day of April, 1994

*Attest:*

BRUCE LEHMAN

*Attesting Officer*  Commissioner of Patents and Trademarks